United States Patent [19]

Keating et al.

[11] Patent Number: 4,667,449

[45] Date of Patent: May 26, 1987

[54] ACCESS DOOR

[75] Inventors: Henry M. Keating, Grosse Pointe Park, Mich.; Kirby C. Fortenberry, Houston, Tex.

[73] Assignee: Flexmaster U.S.A., Inc., Tex.

[21] Appl. No.: 836,101

[22] Filed: Mar. 4, 1986

[51] Int. Cl.⁴ .............................................. E06B 1/04
[52] U.S. Cl. ....................................... 52/213; 138/92; 220/288; 220/293; 49/465; 49/466
[58] Field of Search .......................... 52/208, 213, 221; 138/92; 49/40, 41, 463, 465, 466; 220/288, 293; 292/204

[56] References Cited

U.S. PATENT DOCUMENTS

| | | | |
|---|---|---|---|
| 1,327,377 | 1/1920 | Dick | 138/92 |
| 2,601,148 | 6/1952 | Jackson | 52/208 |
| 2,650,124 | 8/1953 | Olson | 49/465 |
| 2,866,572 | 12/1958 | Llewhellin | 220/293 |
| 2,906,863 | 9/1959 | Ritter | 49/463 |
| 3,389,505 | 6/1968 | Zitomer | 49/463 |
| 3,797,172 | 3/1974 | Cannon | 49/463 |
| 3,818,816 | 6/1974 | Petit | 49/465 |
| 3,854,248 | 12/1974 | Dayus | 49/465 |
| 3,978,554 | 9/1976 | Miller, Jr. | 49/463 |
| 4,300,702 | 11/1981 | Scharrer | 220/293 |
| 4,334,630 | 6/1982 | Bergin | 220/293 |

OTHER PUBLICATIONS

Genflex Flexible Duct Systems, Submittal Data, Access Door-Port Series.

Primary Examiner—William F. Pate, III
Assistant Examiner—Michael Safavi
Attorney, Agent, or Firm—Burton, Parker & Schramm

[57] ABSTRACT

An access door for an air conditioning duct or the like has a circular frame intended to be rotated into a circular opening in the duct wall. The frame has an inwardly extending circular shoulder against which abuts a removable circular door held in place by latch means engaging within a circular groove formed in the frame.

4 Claims, 7 Drawing Figures

ACCESS DOOR

DESCRIPTION

1. Field of Invention

This invention relates to access doors for sheet metal walls such as the walls of air conditioning ducks and air plenums.

2. Background of Invention

It is often desirable to provide an acess door in an air conditioning duct or air plenum to enable access to the interior of the duct or plenum for the purpose of servicing equipment therewithin. Such access doors are frequently installed in the ducts or air plenums in the field rather than in the shop at the time the ducts or plenums are being manufactured. When the access doors are installed in the field, a labor intensive operation is required for a workman to mark the opening, cut it with suitable cutters, and then fasten a door frame to the sheet metal wall of the duct or air plenum and then install the door within the frame. Heretofore frames for such access doors have been mounted in duct walls by first cutting an opening and then securing the frame using pop rivets, screws, welding or the like. Generally, such doors have been of rectangular or square configuration and the frame used for such has been correspondingly square or rectangular and is made up before hand. The labor required to cut the opening and set the frame is sufficiently high so that this becomes a serious cost consideration in the installation of an extensive air conditioning system.

Heretofore, it has been suggested that in lieu of providing a frame, a circular access door might be directly mounted in a duct wall but such has not been satisfactory because of the difficulty of sealing the door in the duct wall and removing the door for purposes of gaining access to the interior of the duct once the door was sealed in the duct. However, such a door has been supplied to the trade by General Environment Corporation of California.

In other instances access doors have been provided by cutting an opening and then hingedly mounting a door to one edge of the opening with latch means being provided to secure the door to the wall of the duct. Mounting the hinges required considerable time by the workmen and the lack of a frame with the presence of an opening in the duct wall weakened the wall and thus while such doors are used, the cost thereof is high and the resulting construction only marginally, if at all, satisfactory.

SUMMARY OF INVENTION

I have disclosed herein an access door which may be quickly mounted in a duct wall and which may be easily opened and closed whenever desired. The invention contemplates a circular frame having an edge portion defining a radially outwardly opening circumferential groove adapted to embrace the marginal edge of a circular wall opening which is cut in the duct wall by the workmen. Tools are commercially available today which will enable a workman to quickly cut a circular opening in a duct or plenum wall. After the opening in the duct wall has been formed, the workman cuts a radial slit in the marginal edge of the circular opening in the duct wall. A corresponding slit is already provided in the groove of the circular frame so that when the two slits are interfitted the frame may be rotated into the duct wall. No other fastening of the frame in the wall is required. An inwardly extending continuous circumferential shoulder is provided within the circular frame and a circular door is removably received within the frame and held in place by suitable latch means. Total installation time for such an access door is but a matter of a few minutes.

BRIEF DESCRIPTION OF THE PREFERRED EMBODIMENT

Figure 5:
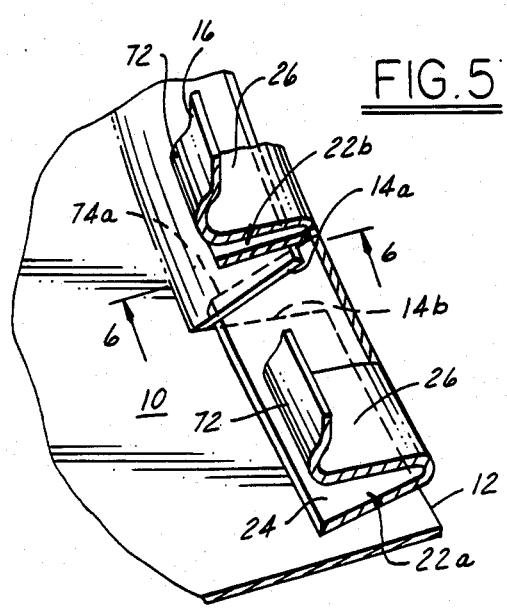
FIG. 5 is a fragmentary perspective view partially in section through the slit in the marginal edge of the circular duct wall opening and the circular frame illustrating how the frame and duct wall are rotated together to mount the frame in the wall.
Figure 6:
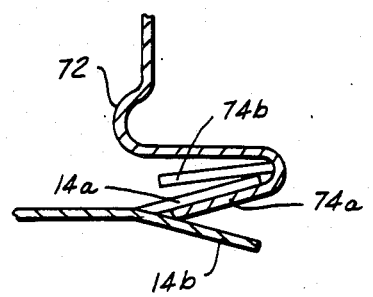
FIG. 6 is a cross sectional view taken on the line 6—6 of FIG. 5.

A sheet metal wall 10 such as the wall of an air conditioning duct or air plenum is intended to have my access door mounted therein. After spotting the location where the door is to be mounted, the workmen cut a circular opening 12 in the wall 10. A commercially available tool sold under the name O-Cutter and manufactured by Malco Tool Company, Annandale, Minn., is available for quickly cutting circular openings of various diameters in sheet metal duct walls. Following the cutting of the circular opening, the workman cuts a radial slit 14 in the marginal edge of the opening 12 and bends outwardly as at 14a one edge of the slit as shown in FIG. 5, and inwardly as at 14b the other edge as shown in FIG. 6.

Figure 4:
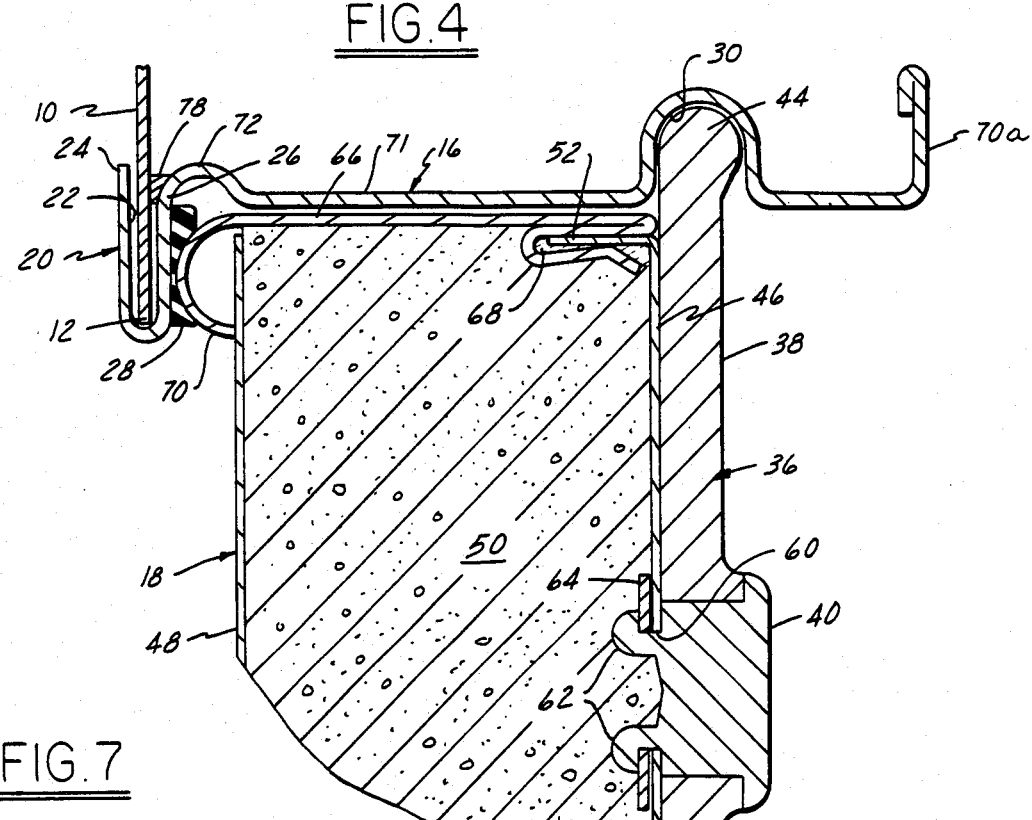
FIG. 4 is a cross sectional view taken substantially on the line 4—4 of FIG. 2.
Figure 7:
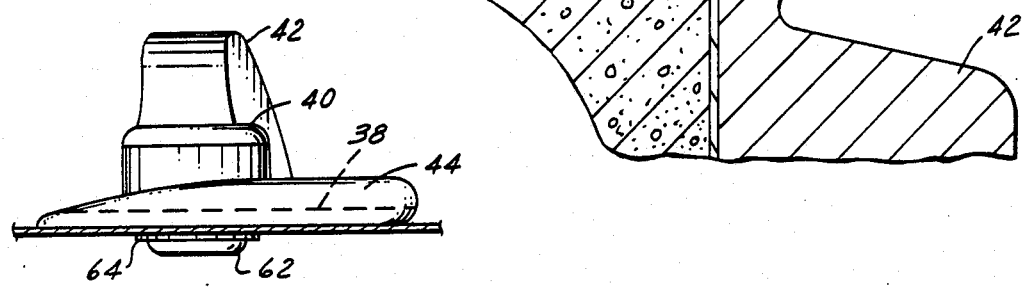
FIG. 7 is a side view of the latch.

The access door of my invention comprises a sheet metal or other suitable frame 16 of cylindrical configuration within which is movably mounted an access door proper 18. As best shown in FIG. 4 the frame 16 has an edge portion 20 defining a radially outwardly opening circumferential groove 22 for embracing the marginal edge of the circular wall open 12 in the duct. Such radially outwardly opening circumferential groove is defined by frame portions 24 and 26 arranged in closely spaced relation to closely overlie and embrace the marginal edge of the opening 12. Frame portion 26 also defines an axially outwardly facing shoulder against which the access door 18 abuts when it is locked in place in the frame as hereinafter described. A gasket 28 overlies the shoulder such that the door 18 bears thereagainst to affect a seal between the access door and the frame.

Figure 1:
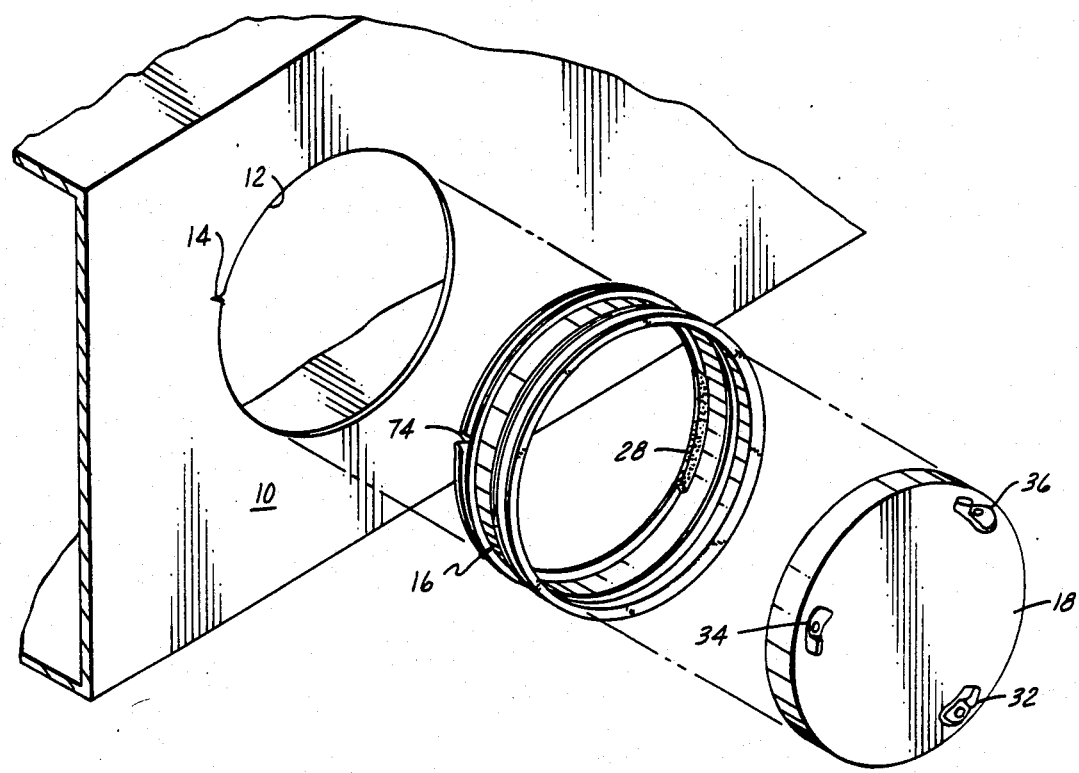
FIG. 1 is a perspective exploded view of my access door for mounting in a sheet metal wall.
Figures 2, 3:
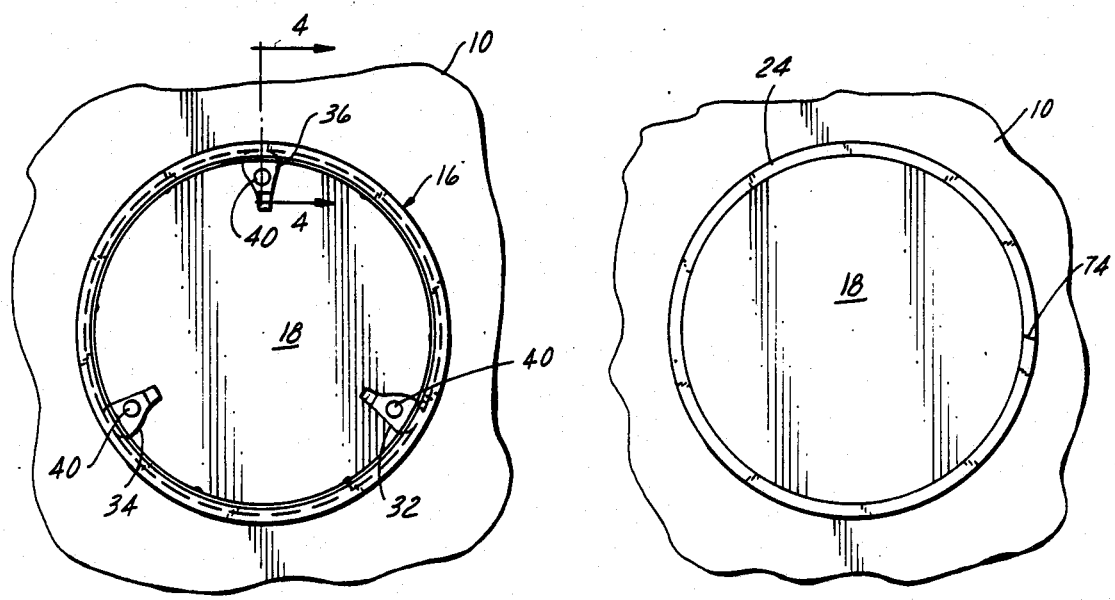
FIG. 2 is a front (outside) view of an access door embodying my invention mounted in a duct wall.
FIG. 3 is a view from the inside of the duct showing the access door mounted therein.

Spaced axially outwardly from the shoulder 26, the frame is provided with a radially inwardly opening continuous groove 30. Such groove is adapted to receive latches 32, 34, and 36 best shown in FIGS. 1, 2 and 4. Each latch comprises a body member 38 swingably mounted on a pivot 40 and having a handle portion 42 and a cam shaped locking portion 44 which is received within the groove 30. Upon swinging the latch member 38 about the pivot 40, the cam locking portion 44 is moved into or out of engagement with the groove 38 to urge the door 18 toward the gasket 28 to effect a sealed and locked condition in the frame.

The door 18 is made up of a pair of circular panels 46 and 48 arranged in spaced apart relationship with an insulation material such as styrofoam or the like 50 sandwiched therebetween. The panel 46 has a right angle turned peripheral edge 52 as shown in FIG. 4. The latches 32, 34, and 36 are mounted on the panel 46. The pivot member 40 is received through a suitable opening 60 in panel 46 and the inner end of the pivot is spread apart as at 62 to overlie a washer 64 to retain the pivot within the panel 46.

Surrounding the peripheral edge of the access door and enclosing the insulation therewith is a cylindrical continuous peripheral wall member 66. One margin of the wall member is folded back on itself at 68 to form a groove 68 into which the lip 52 of the panel 46 is received. The opposite margin of the encircling wall 66 is curved radially inwardly to from a bead-like projection 70 which faces the shoulder 26 and abuts the the gasket 28 as shown. The bead overlies the panel 48 and serves to integrate the two panels and the insulation and hold the panels in their sandwiched relation about the insulation 50. If desired the joint at groove 68 and lip 52 may be tack or spot welded to insure the integrity of the door.

The outer edge of the frame may be upturned as at 70a; and such together with the portions forming the groove 30 and the bead like corner 72 between the shoulder 26 and the axially extending portion 71 of the frame serve to reinforce and stiffen the frame. At least at one point around the circumference of the frame at the edge portion 20 the wall 24 is radially slit as at 74 to provide a pair of cut edges 74a and 74b as shown in FIG. 5. At this radial slit the groove 22 is opened up somewhat on one side of the slit as shown at 22a in FIG. 5 while it remains undisturbed in the area of 22b. This facilitates the inter-engagement of the slit edges 74a and 74b with the slit 14 in the wall of the duct to enable the workmen to rotate readily the frame into the circular opening of the duct and thereby mount the frame 16 in such opening.

If desired, after the frame has been mounted as aforesaid in the duct wall, a bead of sealant 78, as shown in FIG. 4, may be applied to the joint between the duct wall and frame.

We claim:

1. An access door for a sheet metal wall comprising:
   a cylindrical frame having an edge portion defining a radially outwardly opening circumferential groove for embracing an edge of a circular opening in a sheet metal wall to mount the frame in the wall;
   said edge portion configured to provide a radially inwardly extending circumferential shoulder within the frame defining an access opening through the frame;
   said frame having an inwardly opening circumferential groove spaced axially from said shoulder;
   a door moveably mounted in the frame between said circumferential shoulder and said inwardly opening circumferential groove and adapted to overlie and abutt said circumferential shoulder; and
   means on the door moveable into and out of said inwardly opening circumferential groove to latch the door in the frame against said shoulder.

2. The invention defined by claim 1 wherein said inwardly opening circumferential groove is defined by a radially outwardly extending circumferential frame portion.

3. The invention defined by claim 1 wherein sealing means are provided between said shoulder and the door.

4. The invention defined by claim 1, wherein said door comprises a pair of circular panels arranged in parallel spaced relation with an insulating medium sandwiched therebetween, and a peripheral continuous wall member encircling the panels and overlying the edges, thereof to hold them sandwiched against the insulating medium, and said peripheral continuous wall member having a bead-like circumferentially continuous marginal edge directed toward and sealingly abutting said shoulder.

* * * * *